(12) United States Patent
Nagaoka et al.

(10) Patent No.: US 8,656,704 B2
(45) Date of Patent: Feb. 25, 2014

(54) FUEL INJECTION CONTROL DEVICE

(75) Inventors: Daiji Nagaoka, Fujisawa (JP); Teruo Nakada, Fujisawa (JP); Akihide Oogushi, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 306 days.

(21) Appl. No.: 12/867,538

(22) PCT Filed: Feb. 17, 2009

(86) PCT No.: PCT/JP2009/052671
§ 371 (c)(1),
(2), (4) Date: Aug. 13, 2010

(87) PCT Pub. No.: WO2009/104590
PCT Pub. Date: Aug. 27, 2009

(65) Prior Publication Data
US 2010/0319328 A1 Dec. 23, 2010

(30) Foreign Application Priority Data
Feb. 19, 2008 (JP) .................................. 2008-037455

(51) Int. Cl.
*F01N 3/18* (2006.01)
(52) U.S. Cl.
USPC ............................................. 60/286; 60/295
(58) Field of Classification Search
USPC .................................. 60/286, 295, 301, 303
See application file for complete search history.

(56) References Cited

U.S. PATENT DOCUMENTS

| 6,069,783 A | * | 5/2000 | Mount et al. ................... 361/154 |
| 6,402,505 B1 | * | 6/2002 | Okada et al. .................... 431/18 |
| 7,703,278 B2 | | 4/2010 | Kobayashi et al. |

FOREIGN PATENT DOCUMENTS

| JP | 2002-295298 A | 9/2002 |
| JP | 2002-256850 A | 11/2002 |
| JP | 2004-108344 A | 8/2004 |
| JP | 2002-188485 A | 5/2005 |
| JP | 2005-320914 A | 11/2005 |
| JP | 2007-315313 A | 6/2007 |

OTHER PUBLICATIONS

PCT Search Report for Serial No. PCT/JP2009/052671 dated May 11, 2009.

* cited by examiner

*Primary Examiner* — Kenneth Bomberg
*Assistant Examiner* — Jonathan Matthias
(74) *Attorney, Agent, or Firm* — McCormick, Paulding & Huber LLP

(57) ABSTRACT

Provided is a fuel injection control device that affords a wider lower limit range of injection amount by a injector for cylinder outside injection, and that can respond to injection requirements over a wider injection amount range. A fuel injection control device includes: a injector 14 for cylinder outside injection that injects fuel into an exhaust passage 12 of an engine 1, in an amount corresponding to a duty ratio; and a control means 15 for controlling the injector 14 for cylinder outside injection, wherein the control means 15 changes an injector driving frequency upon determining the duty ratio, such that the frequency is lowered, stepwise or continuously, as the required injection amount decreases.

6 Claims, 5 Drawing Sheets

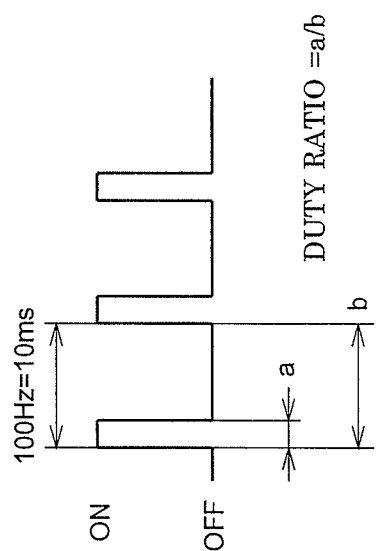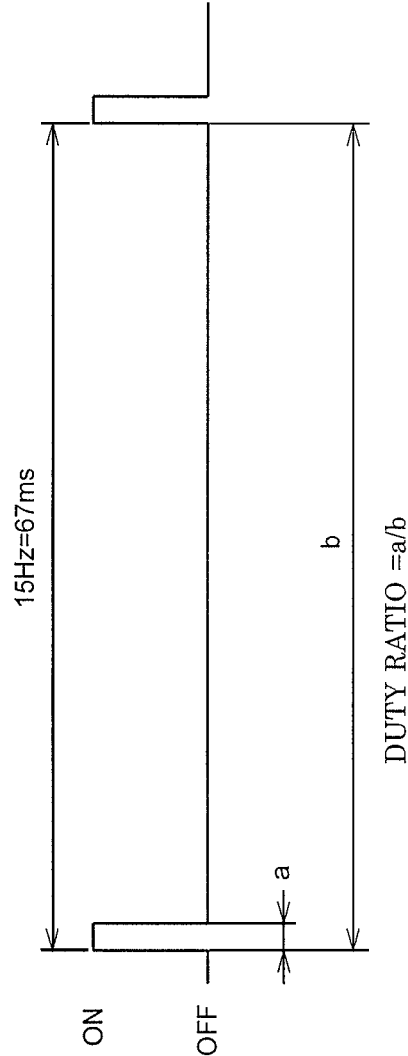

FUEL INJECTION CONTROL DEVICE

CROSS REFERENCE TO RELATED APPLICATIONS

This application is entitled to the benefit of and incorporates by reference essential subject matter disclosed in International Patent Application No. PCT/JP2009/052671 filed on Feb. 17, 2009 and Japanese Patent Application No. 2008-037455 filed Feb. 19, 2008.

TECHNICAL FIELD

The present invention relates to a fuel injection control device provided with a injector for cylinder outside injection that injects fuel into an exhaust passage of an engine.

BACKGROUND ART

The exhaust gas discharged by a diesel engine contains, for instance, particulate matter (PM) and nitrogen oxides (NOx). There are methods in which a filter (diesel particulate filter) having a catalyst or the like is provided in an exhaust passage of an engine, in order to capture PM in the exhaust gas, and fuel is injected into the exhaust passage, upstream of the filter, in order to remove the PM captured by the filter (see Japanese Patent Application Laid-open No. 2002-295298 and Japanese Patent Application Laid-open No. 2007-315313).

Means for injecting fuel into an exhaust passage include, for instance, injectors for low-pressure injection (for instance, multihole nozzles and swirl nozzles for gasoline engines). In driving control of such injectors for low-pressure injection, an actuator that drives the injector is driven at a constant driving frequency (for instance, 100 Hz). The amount of fuel injected by the injector is controlled by changing a duty ratio that is determined on the basis of the driving frequency.

The initial stage of valve opening in the injector comprises a so-called dead time period (duty ratio of about 0 to 10%) in which a needle valve (needle) is not lifted, and no fuel is injected. The last stage of valve opening includes a so-called stable time period (duty ratio 90% or higher) in which the needle valve is substantially not closed. Therefore, the injector is used within a duty ratio range of about 10 to 90%, by avoiding the dead time and stable time (see injection amount characteristics in FIG. 5 (with pressurization)).

DISCLOSURE OF THE INVENTION

When using the above-described injector for low-pressure injection as a means for injecting fuel into an exhaust passage, the atmosphere pressure inside the exhaust passage (outside the cylinder) is lower than inside the combustion chamber (inside the cylinder). As a result, the set pressure of the needle valve can be made lower than is the case when the injector is used for in-cylinder injection, and it becomes possible also to use a driving driver without fuel pressurization. Therefore, using the above-described injector for low-pressure injection as a means for injecting fuel into an exhaust passage allows reducing costs, by omitting a pressurization circuit that raises the pressure of fuel that is fed to the injector.

However, omitting the pressurization circuit tends to result in a protracted dead time owing to the resulting drop in driving torque. This gives rise to variability in the amount of injection by the injector when the injection amount is small, and causes the lower limit range of the injection amount by the injector to increase as compared with a case where the fuel is pressurized (injection amount characteristic of FIG. 5 (without pressurization)).

Therefore, it is an object of the present invention to provide a fuel injection control device that affords a wider lower limit range of injection amount by a injector for cylinder outside injection, and that can respond to injection requirements over a wider injection amount range.

In order to attain the above goal, the present invention includes: a injector for cylinder outside injection for injecting fuel into an exhaust passage of an engine, in an amount corresponding to a duty ratio; and control means for controlling the injector for cylinder outside injection, wherein the control means changes an injector driving frequency upon determining the duty ratio, such that the frequency is lowered, stepwise or continuously, as the required injection amount decreases.

The present invention affords the advantageous effect of providing a fuel injection control device that affords a wider lower limit range of injection amount by a injector for cylinder outside injection, and that can respond to injection requirements over a wider injection amount range.

BRIEF DESCRIPTION OF THE DRAWINGS

FIG. 4(*a*) and FIG. 4(*b*) are diagrams illustrating duty ratios; and

BEST MODE FOR CARRYING OUT THE INVENTION

A preferred embodiment of the present invention is explained in detail below with reference to accompanying drawings.

Figure 1:
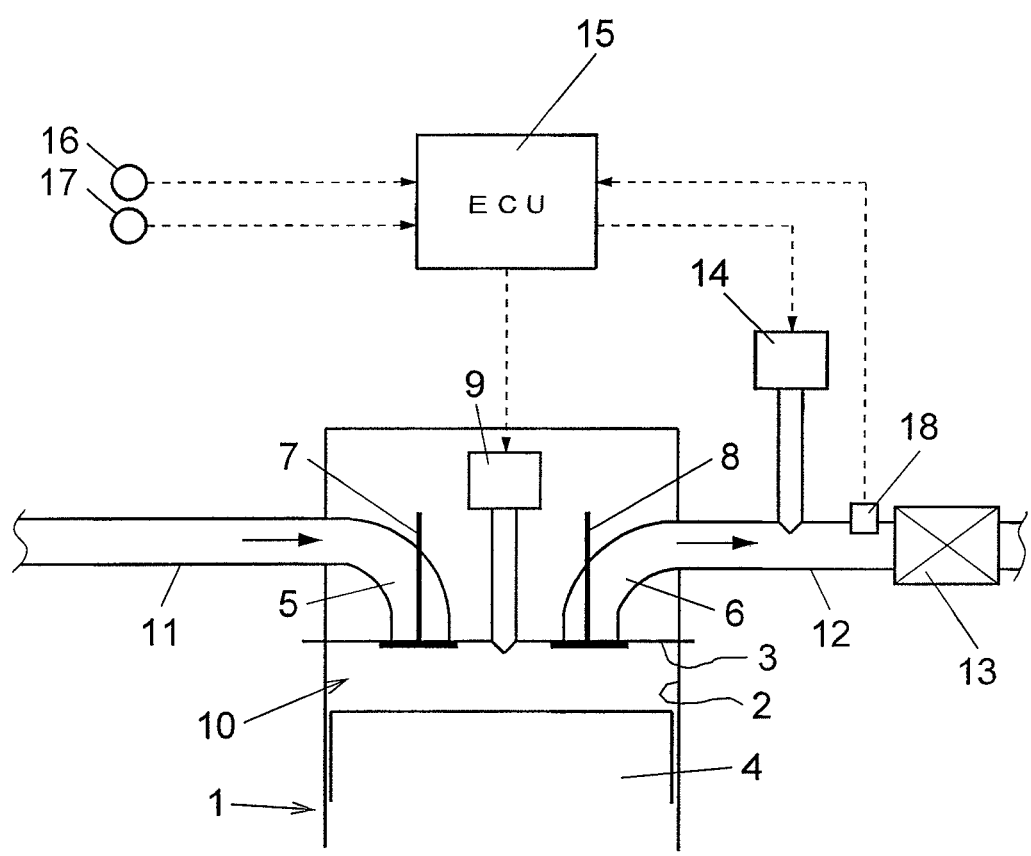
FIG. 1 is a schematic diagram of a fuel injection control device according to an embodiment of the present invention.

As illustrated in FIG. 1, an engine 1 (in the present embodiment, a diesel engine) comprises, for instance, a cylinder 2, a cylinder head 3, a piston 4, an intake port 5, an exhaust port 6, an intake valve 7, an exhaust valve 8 and an in-cylinder injector (injector for cylinder inside injection) 9. A combustion chamber 10 is formed in the space delimited by the cylinder 2, the cylinder head 3 and the piston 4. Fuel is injected directly from the in-cylinder injector 9 into the combustion chamber 10. An intake passage (intake pipe) 11 is connected to the intake port 5. An exhaust passage (exhaust pipe) 12 is connected to the exhaust port 6.

The fuel injection control device according to the present embodiment is used as an exhaust purification device of the engine.

Such a fuel injection control device comprises a filter (diesel particulate filter) 13, provided in the exhaust passage 12 of the engine 1, that captures particulate matter (PM) present in exhaust gas; an out-cylinder injector (injector for cylinder outside injection) 14 provided upstream of the filter 13 in the exhaust passage 12, and which injects fuel into the exhaust passage 12, in order to remove the PM captured by the filter 13; and a control means (hereafter, ECU) 15 that controls the out-cylinder injector 14.

The filter 13 has, for instance, a catalyst.

The ECU 15 estimates the amount of PM captured by the filter 13 on the basis of, for instance, a pressure ratio or differential pressure that is measured by exhaust gas pressure sensors 16, 17 that are provided upstream and downstream, respectively, of the filter 13. When the estimated amount of captured PM exceeds a predetermined amount, and the exhaust gas temperature measured by an exhaust gas temperature sensor 18 that is provided upstream of the filter 13 is lower than a predetermined temperature, the ECU 15 carries out exhaust pipe injection, in which the out-cylinder injector 14 injects fuel into the exhaust passage 12 in order to raise the temperature of the exhaust gas to a predetermined temperature or higher.

The fuel injection amount by the out-cylinder injector 14 is controlled through changes in a duty ratio that is determined on the basis of the driving frequency of the out-cylinder injector 14.

Figure 3:
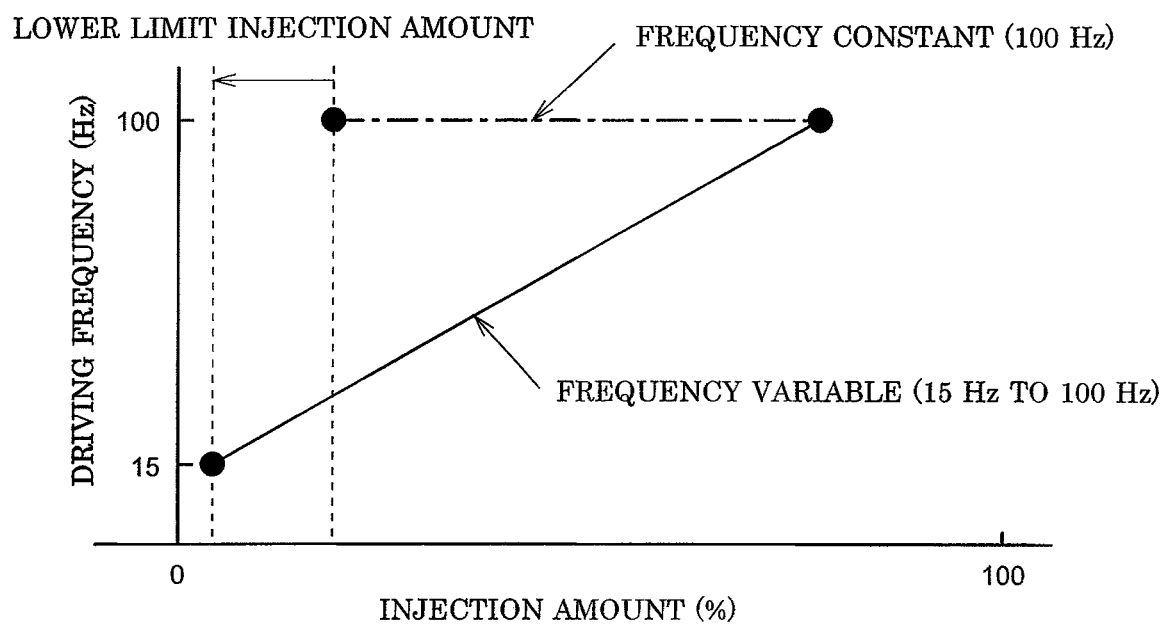
FIG. 3 is a diagram illustrating schematically a table in which there is inputted driving frequency mapped to required injection amount.
Figure 5:
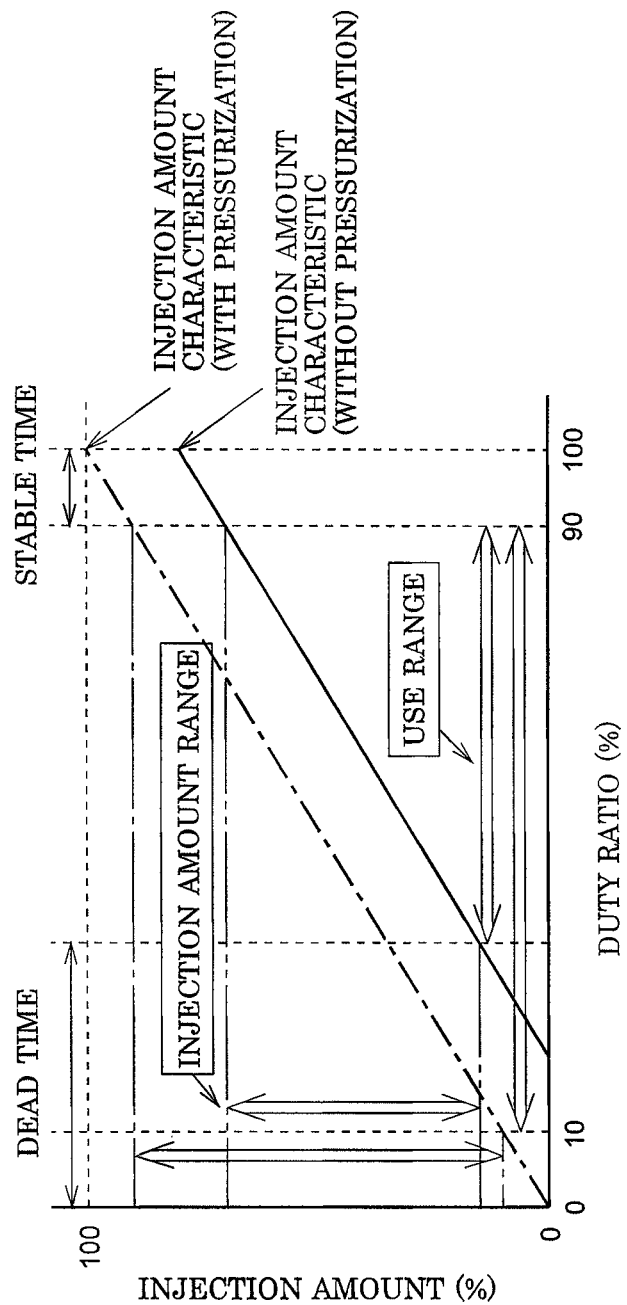
FIG. 5 is a diagram illustrating an injection amount characteristic of an injector.

The ECU 15 changes the driving frequency of the out-cylinder injector 14 (actuator) in such a manner that the frequency becomes continuously lower as the required injection amount decreases (see FIG. 3).

In the present embodiment, the ECU 15 sets the driving frequency of the out-cylinder injector 14 (actuator) to a high frequency (for instance, 100 Hz) when the required injection amount is largest (see FIG. 4(*a*)), sets the driving frequency of the out-cylinder injector 14 (actuator) to a low frequency (for instance, 15 Hz) when the required injection amount is smallest (FIG. 4(*b*)), and changes continuously the driving frequency of the out-cylinder injector 14 (actuator) from the high frequency (100 Hz) to the low frequency (15 Hz) as the required injection amount decreases (see FIG. 3).

The process flow executed by the ECU 15 is explained next with reference to FIG. 2.

Figure 2:
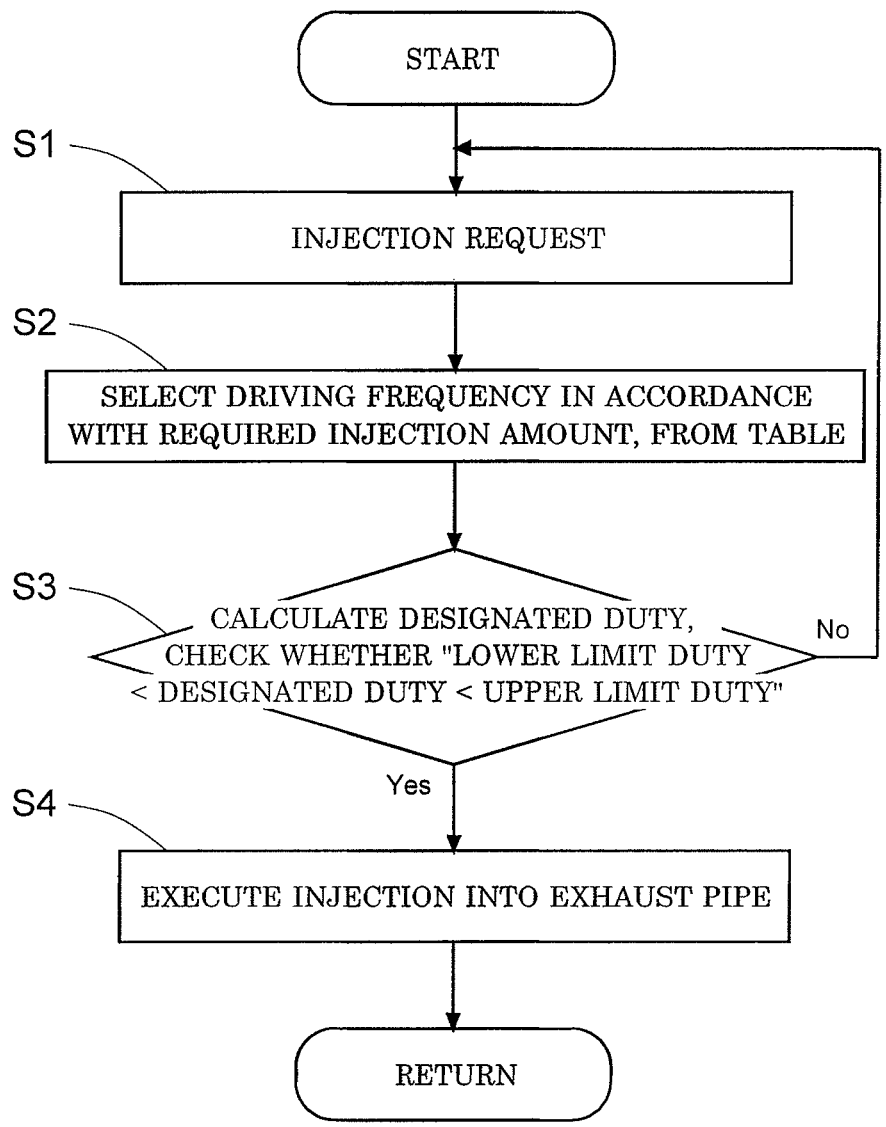
FIG. 2 is a diagram illustrating a process flow by an ECU.

When there is an injection request for the out-cylinder injector 14 (S1 in FIG. 2), the ECU 15 selects a driving frequency corresponding to the required injection amount, on the basis of a table in which driving frequency is inputted beforehand mapped to required injection amount (S2 in FIG. 2).

The ECU 15 calculates next a duty ratio on the basis of the driving frequency, selected from the table, that corresponds to the required injection amount, and determines whether the calculated duty ratio (designated duty) is a value lying between a predetermined lower limit duty and a predetermined upper limit duty (lower limit duty<designated duty<upper limit duty) (S3 in FIG. 2).

If the designated duty is a value lying between a predetermined lower limit duty and a predetermined upper limit duty, the ECU 15 drives the out-cylinder injector 14 (actuator) in accordance with the designated duty, to elicit thereby injection into the exhaust pipe by the out-cylinder injector 14 (S4 in FIG. 2).

When in the present embodiment the required injection amount is smallest, there is selected, as the driving frequency of the out-cylinder injector 14 (actuator), a frequency (15 Hz) that is lower than the frequency when the required injection amount is large. As a result, the lower limit of the injection amount by the out-cylinder injector 14 is 0.15 times ($15/100=1/6.7$ times) the injection amount at the time where the driving frequency is constant (100 Hz), assuming that the injection pressure of the fuel remains the same.

That is, the injector can be used down to a low injection amount range, and the lower limit range of the injection amount by the out-cylinder injector 14 can be expanded, by enabling the driving frequency of the out-cylinder injector 14 (actuator) to be changed to a frequency lower than 100 Hz, as compared with a case (see FIG. 3) in which the driving frequency of the out-cylinder injector 14 (actuator) is constant (100 Hz).

When in the present embodiment the required injection amount is greatest, there is selected, as the driving frequency of the out-cylinder injector 14 (actuator), a frequency (100 Hz) that is higher that the frequency when the required injection amount is small. As a result, the upper limit of the injection amount by the out-cylinder injector 14 is the same injection amount as the injection amount when the driving frequency is constant (100 Hz), assuming that the injection pressure of the fuel remains the same.

Preferred embodiments of the present invention have been explained above, but the invention is not limited to such embodiments, and can be embodied in various other ways.

For instance, the filter 13 may capture also nitrogen oxides (NOx). Also, the ECU 15 may change the driving frequency of the out-cylinder injector 14 (actuator) to drop stepwise, as the required injection amount decreases.

What is claimed is:

1. A fuel injection control device, comprising:
    an injector for cylinder outside injection configured to inject fuel into an exhaust passage of an engine, in an amount corresponding to a duty ratio; and
    an engine control unit for controlling the injector for cylinder outside injection;
    wherein the engine control unit is configured to lower, stepwise or continuously, an injector driving frequency upon determining the duty ratio as the required injection amount decreases, in whole range of the required injection amount; and
    wherein the engine control unit has a table in which the injector driving frequency is inputted beforehand and mapped to the required injection amount.

2. The fuel injection control device according to claim 1, wherein the engine control unit does not carry out cylinder outside injection when the injector driving frequency determined according to the required injection amount is not within a predetermined range.

3. The fuel injection control device according to claim 2, wherein the engine control unit is configured to:
    set the injector driving frequency to 100 Hz when the required injection amount is largest, set the injector driving frequency to 15 Hz when the required injection amount is smallest, and
    change stepwise or continuously the injector driving frequency from 100 Hz to 15 Hz as the required injection amount decreases.

4. The fuel injection control device according to claim 2, wherein the engine control unit is configured to:
    select the injector driving frequency corresponding to the required injection amount,
    calculate the duty ratio on the basis of the selected injector driving frequency,
    drive the out-cylinder injector in accordance with the calculated duty ratio when the calculated duty ratio is a value lying between a predetermined lower limit duty and a predetermined upper limit duty.

5. The fuel injection control device according to claim 4, wherein the lower limit duty is 10%, and the upper limit duty is 90%.

6. The fuel injection control device according to claim 2, wherein a filter is provided in the exhaust passage, and
    when an amount of captured particulate matter in the filter exceeds a predetermined amount, and the exhaust gas temperature is lower than a predetermined temperature, the engine control unit determines the injector driving frequency based on the required injection amount.

* * * * *